United States Patent
Aiello et al.

(10) Patent No.: US 9,803,481 B2
(45) Date of Patent: Oct. 31, 2017

(54) REDUCED VIBRATORY RESPONSE ROTOR FOR A GAS POWERED TURBINE

(71) Applicant: United Technologies Corporation, Hartford, CT (US)

(72) Inventors: Nicholas Aiello, Middletown, CT (US); Bob S. Bamford, Middletown, CT (US)

(73) Assignee: United Technologies Corporation, Farmington, CT (US)

( * ) Notice: Subject to any disclaimer, the term of this patent is extended or adjusted under 35 U.S.C. 154(b) by 239 days.

(21) Appl. No.: 14/740,316

(22) Filed: Jun. 16, 2015

(65) Prior Publication Data
US 2015/0369045 A1 Dec. 24, 2015

Related U.S. Application Data

(60) Provisional application No. 62/014,757, filed on Jun. 20, 2014.

(51) Int. Cl.
| | | |
|---|---|---|
| *F01D 5/02* | (2006.01) | |
| *F01D 5/14* | (2006.01) | |
| *F01D 5/16* | (2006.01) | |
| *F02C 3/04* | (2006.01) | |

(52) U.S. Cl.
CPC ............... *F01D 5/02* (2013.01); *F01D 5/027* (2013.01); *F01D 5/141* (2013.01); *F01D 5/16* (2013.01); *F02C 3/04* (2013.01); *F05D 2220/32* (2013.01); *F05D 2230/60* (2013.01); *F05D 2240/80* (2013.01); *F05D 2260/941* (2013.01); *Y02T 50/671* (2013.01); *Y02T 50/673* (2013.01); *Y10T 29/49323* (2015.01)

(58) Field of Classification Search
CPC . F01D 5/02; F01D 5/027; F01D 5/141; F01D 5/16; F01D 5/10; F01D 5/26; F02C 3/04; F05D 2260/96
USPC ............... 416/93 A, 144, 500, 239, 215–218
See application file for complete search history.

(56) References Cited

U.S. PATENT DOCUMENTS

| | | | |
|---|---|---|---|
| 4,817,455 A | | 4/1989 | Buxe |
| 4,848,182 A | * | 7/1989 | Novotny ................ F01D 5/027 |
| | | | 416/144 |
| 4,926,710 A | * | 5/1990 | Novotny ................ F01D 5/027 |
| | | | 29/447 |
| 4,961,686 A | | 10/1990 | Blair et al. |
| 5,108,261 A | | 4/1992 | Ress, Jr. et al. |
| 6,354,780 B1 | * | 3/2002 | Davis ..................... F01D 5/027 |
| | | | 414/146 |

(Continued)

FOREIGN PATENT DOCUMENTS

| | | |
|---|---|---|
| EP | 1452687 | 9/2004 |
| EP | 1586741 | 10/2005 |

(Continued)

OTHER PUBLICATIONS

Extended European Search Report for European Application No. 15171747.0 dated Oct. 22, 2015.

*Primary Examiner* — Steven Sutherland
(74) *Attorney, Agent, or Firm* — Carlson, Gaskey & Olds, P.C.

(57) ABSTRACT

A rotor for a turbomachine includes a rim defining a base of a rotor, an airfoil shaped blade extending from said rim and defining a chord line and a bore extending from said rim opposite said airfoil shaped blade. The rim further includes at least one rail extending away from said airfoil shaped blade.

16 Claims, 4 Drawing Sheets

(56) References Cited

U.S. PATENT DOCUMENTS

2009/0269202 A1* 10/2009 Borzakian ............... F01D 5/027
                                                  416/220 R
2012/0297790 A1* 11/2012 Alvanos .................. F01D 5/282
                                                  60/796

FOREIGN PATENT DOCUMENTS

| EP | 1862698 | 12/2007 |
| EP | 2009238 | 12/2008 |
| EP | 2677119 | 12/2013 |
| JP | 04-285341 | 10/1992 |
| JP | 2012047101 | 3/2012 |

* cited by examiner

REDUCED VIBRATORY RESPONSE ROTOR FOR A GAS POWERED TURBINE

CROSS-REFERENCE TO RELATED APPLICATION

This application claims priority to U.S. Provisional Application Ser. No. 62/014,757 filed on Jun. 20, 2014.

TECHNICAL FIELD

The present disclosure relates generally to gas powered turbines, and more specifically to a balanced rotor for use in a gas powered turbine.

BACKGROUND

Gas powered turbines utilize a compressor to compress air. The compressed air is provided to a combustor, where the compressed air is mixed with a fuel and ignited. Combustion gasses resulting from the ignition are expelled from the combustor into a turbine section. The combustion gasses expand as they pass through the turbine section, driving the turbine section to rotate. The turbine section is coupled to at least one shaft and drives rotation of another component. In a gas turbine engine for an aircraft, the shaft drives rotation of a fan. In a land based turbine system, the shaft is an output shaft driving another component, such as an electric generator.

The compressor portion includes multiple sequential stages that use rotors to drive air through the compressor and compress the air. Rotation of the compressor combined with the air passing through the compressor can cause the rotors within a stage to enter a stiff wise bending mode. The stiff wise bending mode causes the blade of the rotor to rock along a chord line, with the chord line being defined by the blade. The vibrations from the rocking can lead to rotor rim bending and can damage the rotor.

SUMMARY OF THE INVENTION

A rotor for a turbomachine according to an example of the present disclosure includes a rim defining a base of a rotor, an airfoil shaped blade extending from the rim and defining a chord line, a bore extending from the rim opposite the airfoil shaped blade, and the rim further including at least one rail extending away from the airfoil shaped blade.

In a further embodiment of the foregoing embodiment, the at least one rail includes a first rail on a forward edge of the rotor and a second rail on an aft edge of the rotor.

In a further embodiment of any of the foregoing embodiments, the first rail and the second rail have complimentary weight profiles.

In a further embodiment of any of the foregoing embodiments, at least one of the first rail and the second rail comprises a balance feature.

In a further embodiment of any of the foregoing embodiments, the at least one rail is integrally formed with the rim.

In a further embodiment of any of the foregoing embodiments, the at least one rail and the rim are a single material structure.

In a further embodiment of any of the foregoing embodiments, the at least one rail extends beyond a self-sustaining radius of the rotor.

A further embodiment of any of the foregoing embodiments includes a structural support arm extending from the at least one rail.

In a further embodiment of any of the foregoing embodiments, the rotor is a low pressure compressor rotor.

In a further embodiment of any of the foregoing embodiments, the at least one rail is operable to stiffen the rim at the rail.

A method for reducing rotor stress according to an example of the present disclosure includes stiffening at least one of a forward extremity and an aft extremity of a rotor rim by incorporating a first rail at the stiffened extremity.

In a further embodiment of any of the foregoing embodiments, stiffening at least one of the forward extremity and the aft extremity of the rotor rim includes stiffening the forward extremity by incorporating the first rail at the forward extremity and incorporating a second rail at the aft extremity of the rim.

A further embodiment of any of the foregoing embodiments includes balancing the rotor by causing the first rail to be complimentarily balanced with the second rail.

A further embodiment of any of the foregoing embodiments includes balancing the rotor by adapting a rotor bore such that the rotor bore is complimentarily balanced with the first rail.

A further embodiment of any of the foregoing embodiments includes connecting a web to the rim, thereby tuning a steady stress of the rotor.

A gas turbine according to an example of the present disclosure includes a compressor section, a combustor fluidly connected to the compressor section, and a turbine section fluidly connected to the combustor. Each of the compressor section and the turbine section has a plurality of stages, and each of the plurality of stages has a plurality of rotors. At least one of the plurality of rotors includes a rim defining a base of the rotor, an airfoil shaped blade extending from the rim and defining a chord line, a bore extending from the rim opposite the airfoil shaped blade, and the rim further including at least one rail extending away from the airfoil shaped blade. At least one rail is operable to stiffen the rim at the rail.

In a further embodiment of any of the foregoing embodiments, each of the plurality of rotors in one of the plurality of stages includes, a rim defining a base of the rotor, an airfoil shaped blade extending from the rim and defining a chord line, a bore extending from the rim opposite the airfoil shaped blade and the rim further including at least one rail extending away from the airfoil shaped blade. At least one rail is operable to stiffen the rim at the rail.

In a further embodiment of any of the foregoing embodiments, one of the plurality of stages is a first compressor stage relative to fluid flow through the gas turbine.

These and other features of the present invention can be best understood from the following specification and drawings, the following of which is a brief description.

DETAILED DESCRIPTION OF AN EMBODIMENT

Figure 1:
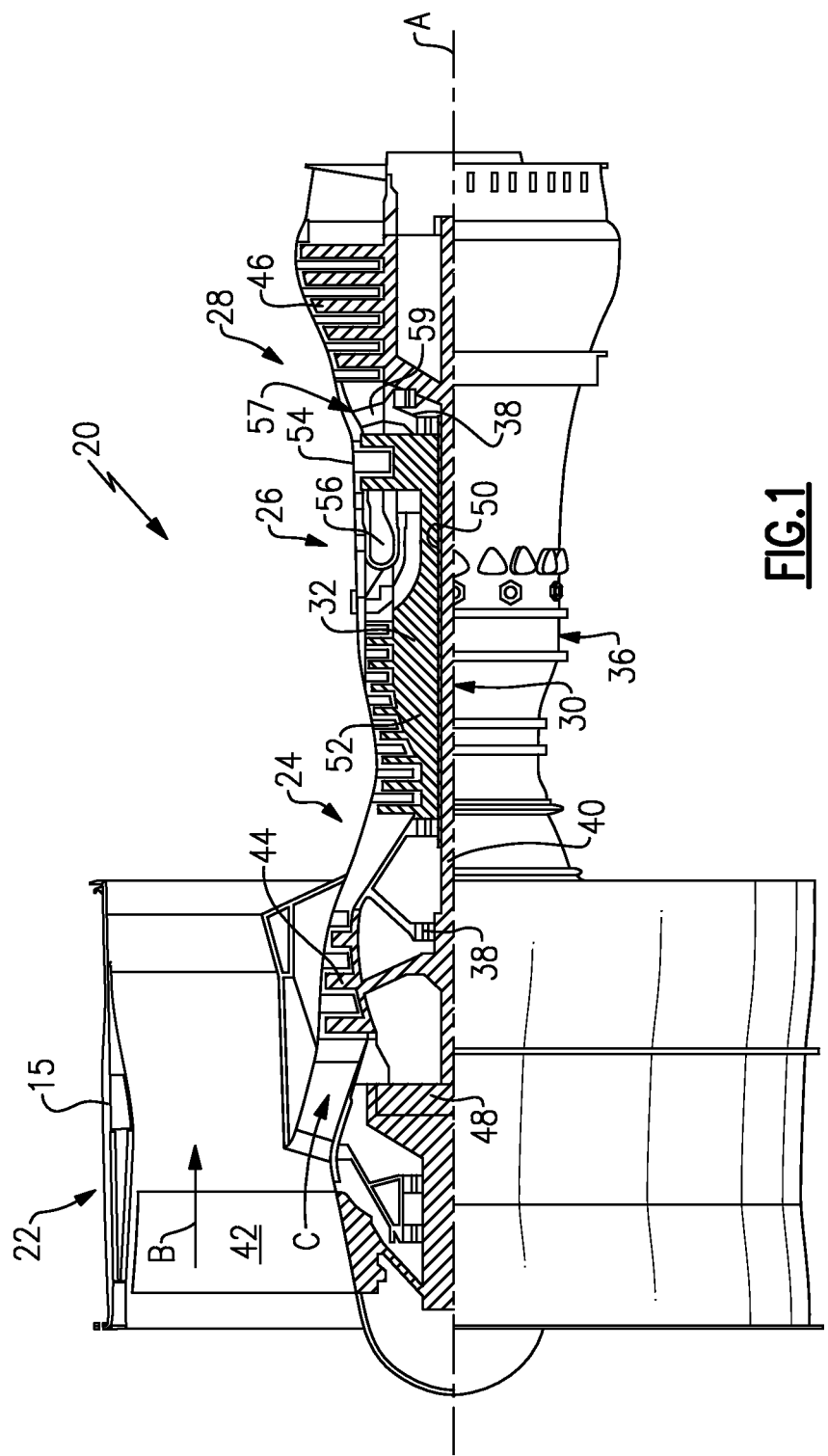
FIG. 1 schematically illustrates an example gas turbine engine.

FIG. 1 schematically illustrates a gas powered turbine 20. The gas powered turbine 20 is disclosed herein as a two-spool turbofan engine that generally incorporates a fan section 22, a compressor section 24, a combustor section 26 and a turbine section 28. Alternative engines might include an augmentor section (not shown) among other systems or features. Alternative gas powered turbines, such as land based turbines, omit the fan section entirely. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures, and to other types of gas powered turbines.

The exemplary gas powered turbine 20 generally includes a low speed spool 30 and a high speed spool 32 mounted for rotation about a central longitudinal axis A relative to a static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in the exemplary gas powered turbine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

Each of the low pressure compressor 44, and the high pressure compressor 52 include pairings of rotors and stators. Each pairing includes a set of rotors and a set of stators. The pairings are referred to as stages. One of skill in the art, having the benefit of this disclosure, will understand that the rotors in the earlier stages are larger than the rotors in the later stages.

During operation of the gas powered turbine 20, rotation of the rotors can cause the rotors to enter a stiff wise bending mode. The stiff wise bending mode is a vibratory mode that causes the blade portion of the rotor to rock in its stiffest direction (i.e. along the chord line defined by the blade). This rocking causes a bending of the rotor rim. The bending, in turn, imparts high hoop vibratory stresses into the rim. The larger the airfoil is, compared to the full rotor, the more susceptible the rotor is to having large deflection, and therefore stresses, in the stiff wise bending mode. In some examples, the stresses are concentrated in either a leading extremity or a trailing extremity of the rim of the rotor. In alternate examples, the stresses are concentrated in both the leading and the trailing extremities of the rotor rim. High vibratory stresses such as these can lead to cracking, and potentially uncontained failure in a rotor disk.

Figure 2:
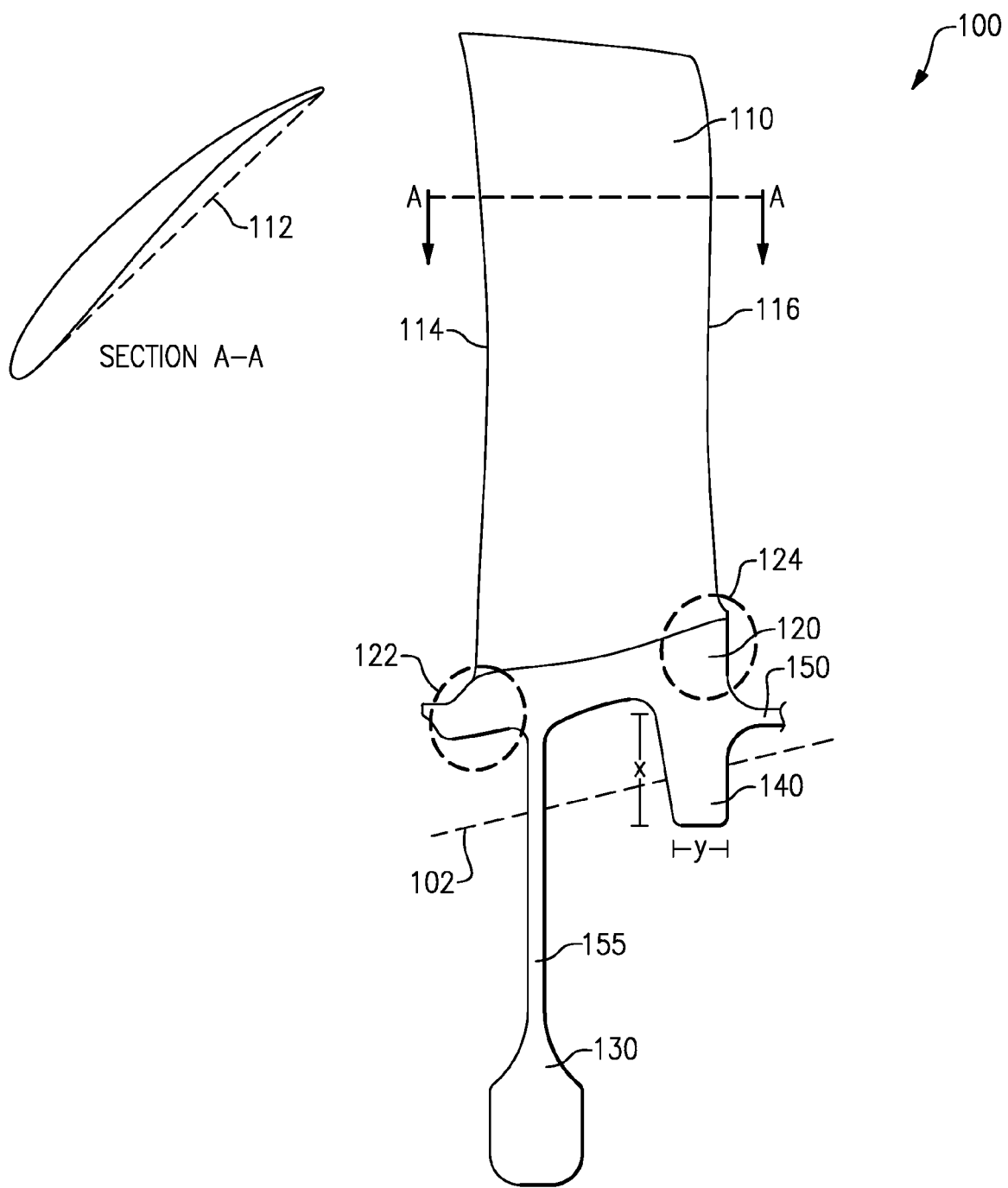
FIG. 2 schematically illustrates a first example rotor for a gas powered turbine.

With continued reference to FIG. 1, FIG. 2 schematically illustrates a rotor 100. The rotor 100 includes a blade 110 extending outward from a rim 120 along a blade chord line 112. The blade 110 is an airfoil shaped blade with a leading edge 114 and a trailing edge 116. The portion of the rotor rim 120 at the leading edge of the blade 110 is referred to as the leading extremity 122. Similarly, the portion of the rotor rim 120 at the trailing edge of the blade 110 is referred to as the trailing extremity 124. A bore 130 extends from the rim 120 in the opposite direction of the blade 110. In an assembled configuration, such as the gas powered turbine 20 of FIG. 1, the blade 110 extends radially outward into the primary flowpath C, and the bore 130 extends radially inward from the rim 120. The bore 130 counters the mass of, and axially balances, the rotor blade 110 according to known rotor construction techniques.

In the example rotor 100 of FIG. 2, the peak vibratory stress is primarily concentrated at the trailing extremity 124 of the rim 120. In other words, the impact of the stress resulting from a stiff-wise bending vibratory mode is primarily located at the trailing extremity 124 of the rim 120. To support the rim 120, and to minimize the impact of the vibratory stresses, a rail 140 extends from the rim 120 opposite the blade 110 at the trailing extremity 124. The rail 140 has a radial length X that, in some examples, extends below a self-sustaining radius 102, allowing the rail 140 to at least partially self balance.

The added material of the rail 140 increases the stiffness of the rim 120 at the rail 140. The increased stiffness, in turn, decreases the impact of the vibratory stresses at the location of the rail 140. The rail 140 extends a sufficient axial distance Y to have sufficient out of plane stiffness to reduce vibratory stresses to desired levels. Including the rail 140 absent any other modifications can off-balance the rotor 100. In order to compensate for the off balance present in a single rail 140 example, the bore 130 is shifted axially, and sized such that the mass of the bore 130 and the single rail 140 together axially balance the mass of the blade 110.

Protruding from the rail 140 is an arm 150. The arm 150 contacts, or connects to, other components within the gas powered turbine 20. Protruding from the rim is a web 155. The web 155 and the bore 130 are shaped and weighted to tune or reduce steady stresses on the rotor 100. In the example of FIG. 2, the combination of the rail 140 and the web 155 reduces both the stiff wise bending mode stresses and the steady stresses on the rotor 100, thereby lengthening the workable lifespan of the rotor 100. It is understood that the preceding also applies at the leading extremity 122 with the rail 140 in line with that extremity.

Figure 3:
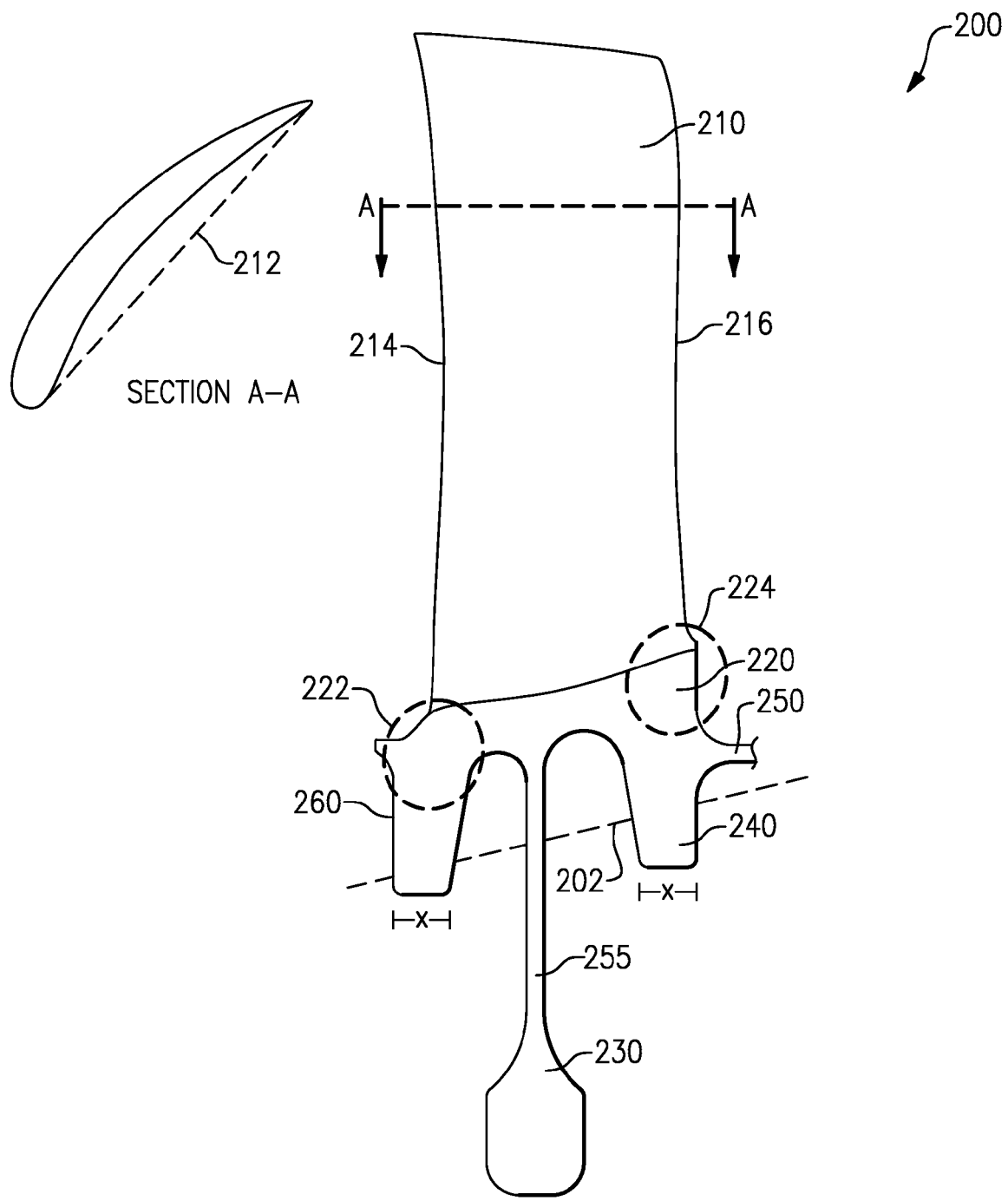
FIG. 3 schematically illustrates a second example rotor for a gas powered turbine.

With continued reference to FIGS. 1 and 2, and with like numerals indicating like elements, FIG. 3 schematically illustrates a second example rotor that can be utilized in the example gas powered turbine 20 of FIG. 1. As with the example of FIG. 2, the example rotor 200 of FIG. 3 includes a blade 210 extending away from a rim 220 along a chord line 212. The blade 210 includes a leading edge 214 and a trailing edge 216. A bore 230 extends away from the rim 220 at approximately the center of the rim 220, and provides mass countering and axially balancing affects against the blade 210.

While the stiff wise bending mode stresses of FIG. 2 are concentrated at the trailing extremity 224 or leading extremity 222 of the rim, the stiff wise bending mode stresses of FIG. 3 are concentrated at both the leading extremity 224 and the trailing extremity 222. To counteract the vibratory modes, a first rail 260 extends from rim 220 at the leading extremity 222. Similarly, a second rail 240 extends from the trailing extremity 224 of the rim 220. In the illustrated example, each of the rails 240, 260 extends beyond a self-sustaining radius 202 of the rotor 200. In alternative examples, the rails 240, 260 do not extend beyond the self-sustaining radius 202. An arm 250 extends from the second rail 240 and serves an identical function to the web 150 described above with regards to the example of FIG. 2. Similarly a web 255 extends from the rim 22 and serves an identical function to the web 155 described above with regard to the example of FIG. 2.

As with the example of FIG. 2, each of the rails 240, 260 has an axial width X, such that the rail has sufficient out of plane stiffness to reduce vibratory stress to desired levels at the leading extremity 222 (in the case of the first rail 260) and the trailing extremity 224 (in the case of the second rail 240). The axial length X of each rail 240, 260 allows the rail to fully stiffen the portion of the rim 220 from which the rail 240, 260 extends.

The density, shape and distribution of material throughout the rail 240, 260 is referred to as the weight profile of the rail 240, 260. Each of the rails 240, 260 is shaped with a specific weight profile that counterbalances the weight profile of the other rail 240, 260. By way of example, if the second rail 240 is shaped with certain features to accommodate the web 250, or other turbine components, the first rail 260 will have a complimentary, but not identical, weight profile to cancel out any unbalance introduced by the features of the second rail 240. The same principle can be applied in reverse, with the features of the second rail counterbalancing any of the features of the first rail 260. By utilizing each of the rails 240, 260 to counterbalance the other rail 240, 260 via the complimentary weight profiles, the bore 230 can be reserved for counterbalancing the blade 210. Furthermore, the added mass of the rails 240, 260 below the self sustaining radius 202, if it exists, provides at least some counterbalancing effect to the blade 210, allowing the size of the bore 230 to be reduced relative to the size of a bore for a rotor without any rails 240, 260.

Figure 4:
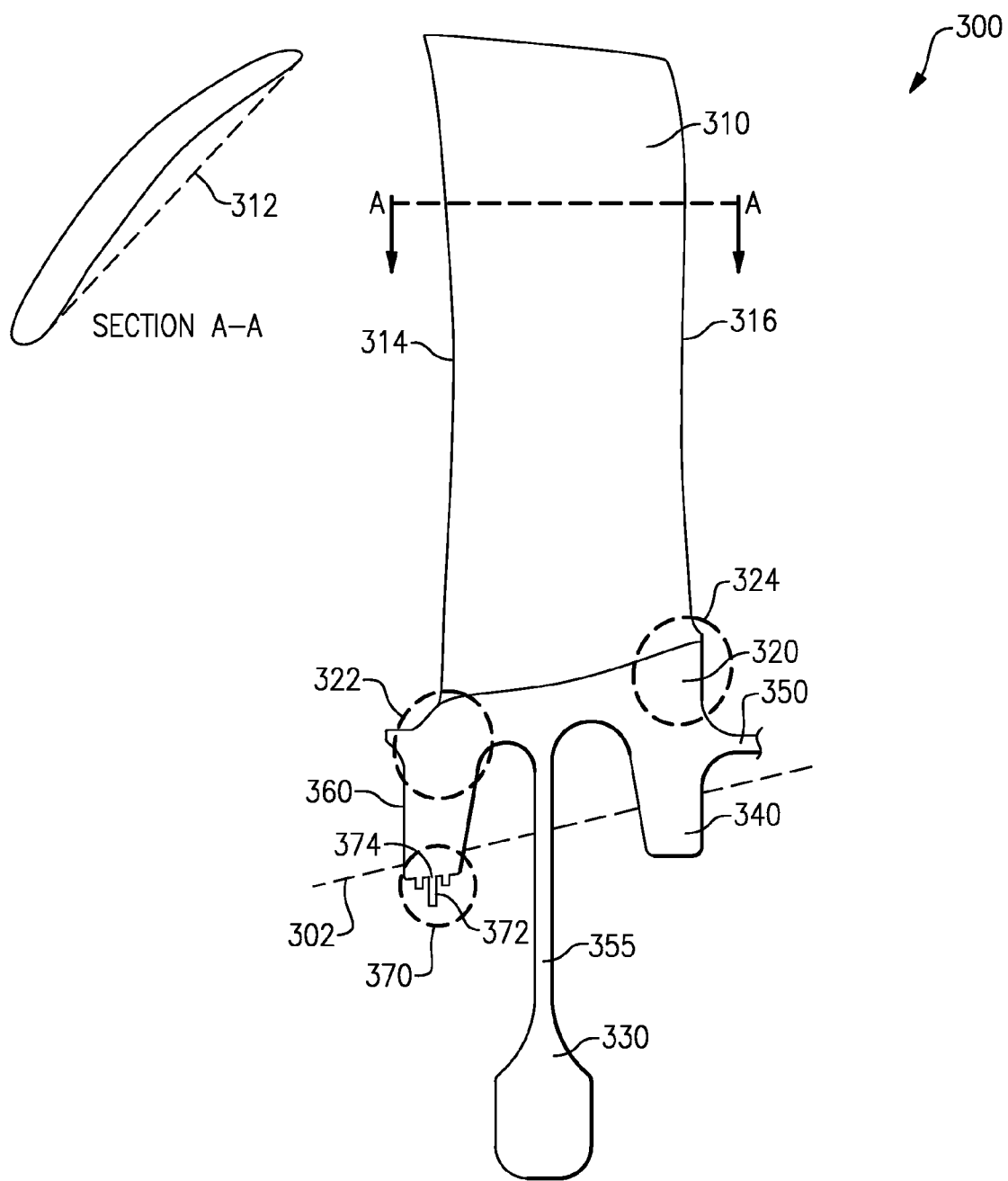
FIG. 4 schematically illustrates a third example rotor for a gas powered turbine.

With continued reference to FIGS. 1-3, and with like numerals indicating like elements, FIG. 4 schematically illustrates a third example rotor 200 for the gas powered turbine 20. The rotor 300 of FIG. 4 is substantially similar to the rotor 200 of FIG. 3, with a blade 310 defining a chord line 312 and extending from a rim 320. The blade includes a leading edge 314 and a trailing edge 316. The rim 320 includes a leading extremity at the blade leading edge 314 and a trailing extremity 324 at the blade trailing edge 316. Two rails 340, 360 may or may not extend radially inward from each of the extremities 322, 324 beyond a self-sustaining radius 302 of the rotor 300. A bore 330 further extends radially inward from the rim 320 between the rails 340, 360.

In the example rotor of FIG. 4, the leading extremity rail 360 includes an additional balancing feature 370. The balancing feature 370 is multiple protrusions 372 and intrusions 374 that are specifically sized and shaped to counterbalance one or more features of the rotor 300. While illustrated on the leading rail 360, the balancing feature 370 can be included on the leading rail 360, the trailing rail 340, or both rails 340, 360. The balancing feature 370 can be utilized to supplement the balancing features of the weight profile of the rotor 300.

While the balancing feature 370 is illustrated herein as rectangular protrusions, one of skill in the art having the benefit of this disclosure will understand that the particular balancing features can take the form of any shape protrusion including, but not limited to, bumps, divots, pyramids, cylinders, or any other shaped protrusion/intrusion.

Referring now to the examples of FIG. 2-5, one of skill in the art having the benefit of this disclosure will appreciate that the example rotors can be utilized and adapted for any stage in the compressor section 24 of FIG. 1. One of skill in the art will further understand that the larger the airfoil 110, 210, 310 to the overall rotor 100, 200, 300, the larger the impact of the vibratory stresses will be on the rim 120, 220, 320. Furthermore, the earlier stages of any compressor section 24 or later sections of any turbine section 46 require larger rotors and stators. As a consequence of this, the present disclosure is of particular use in the first stage, or the early stages, of the compressor section 24 or in the last stage, or the later stages, of the turbine section 46 relative to airflow through the gas powered turbine 20.

Furthermore, while the example rotors are described within the context of a turbine engine as the gas powered turbine 20, one of skill in the art having the benefit of this disclosure will understand that the rotors can be implanted within any gas powered turbine, including land based turbines, and are not limited to the gas turbine engine example of FIG. 1.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A rotor for a turbomachine comprising:
   a rim defining a base of a rotor;
   an airfoil shaped blade extending from said rim and defining a chord line;
   a bore extending from said rim opposite said airfoil shaped blade; and
   the rim further including at least one rail operable to stiffen said rim at said rail and extending radially inward beyond a self-sustaining radius of the rotor and away from said airfoil shaped blade, wherein the bore extends further radially inward from the rim than said at least one rail.

2. The rotor of claim 1, wherein the at least one rail comprises a first rail on a forward edge of the rotor and a second rail on an aft edge of the rotor.

3. The rotor of claim 2, wherein said first rail and said second rail have complimentary weight profiles.

4. The rotor of claim 2, wherein at least one of said first rail and said second rail comprises a balance feature.

5. The rotor of claim 1, wherein said at least one rail is integrally formed with said rim.

6. The rotor of claim 5, wherein said at least one rail and said rim are a single material structure.

7. The rotor of claim 1, further comprising a structural support arm extending from the at least one rail.

8. The rotor of claim 1, wherein the rotor is a low pressure compressor rotor.

9. A method for reducing rotor stress comprising:
stiffening at least one of a forward extremity and an aft extremity of a rotor rim by incorporating a first rail at the stiffened extremity, wherein the rotor rim defines a base of a rotor, and wherein a bore extends radially inward from said rotor rim, and the rotor rim further including at least one rail extending radially inward from the rotor rim beyond a self-sustaining radius of the rotor, wherein the bore extends further radially inward from the rotor rim than said at least one rail.

10. The method of claim 9, wherein stiffening at least one of the forward extremity and the aft extremity of the rotor rim comprises stiffening the forward extremity by incorporating the first rail at the forward extremity and incorporating a second rail at the aft extremity of the rim.

11. The method of claim 10, further comprising balancing the rotor by causing said first rail to be complimentarily balanced with the second rail.

12. The method of claim 9, further comprising balancing the rotor by adapting a rotor bore such that the rotor bore is complimentarily balanced with the first rail.

13. The method of claim 9, comprising connecting a web to said rim, thereby tuning a steady stress of the rotor including the rotor rim.

14. A gas turbine comprising:
a compressor section;
a combustor fluidly connected to the compressor section;
a turbine section fluidly connected to the combustor;
each of said compressor section and said turbine section having a plurality of stages, and each of said plurality of stages having a plurality of rotors;
at least one of said plurality of rotors including
a rim defining a base of the rotor;
an airfoil shaped blade extending from said rim and defining a chord line;
a bore extending from said rim opposite said airfoil shaped blade; and
the rim further including at least one rail extending radially inward beyond a self-sustaining radius of the rotor and away from said airfoil shaped blade, wherein the at least one rail is operable to stiffen said rim at said rail, and wherein the bore extends farther radially inward than the at least one rail.

15. The gas turbine of claim 14, wherein each of said plurality of rotors in one of said plurality of stages includes:
a rim defining a base of the rotor;
an airfoil shaped blade extending from said rim and defining a chord line;
a bore extending from said rim opposite said airfoil shaped blade; and
the rim further including at least one rail extending away from said airfoil shaped blade, wherein the at least one rail is operable to stiffen said rim at said rail.

16. The gas turbine of claim 15, wherein the one of said plurality of stages is a first compressor stage relative to fluid flow through the gas turbine.

* * * * *